United States Patent
Nabert et al.

(10) Patent No.: US 6,343,831 B1
(45) Date of Patent: Feb. 5, 2002

(54) MOTOR VEHICLE, PARTICULARLY A PASSENGER CAR, HAVING MOVABLE ROOF PART

(75) Inventors: Bernd Nabert, Schopfloch; Erwin Lutz, Schwieberdingen; Matthias Zierle, Leinfelden-Echterdingen; Frank Diehm, Kirchheim, all of (DE)

(73) Assignee: Dr. Ing. h.c.F. Porsche, Stuttgart (DE)

( * ) Notice: Subject to any disclaimer, the term of this patent is extended or adjusted under 35 U.S.C. 154(b) by 0 days.

(21) Appl. No.: 09/531,694

(22) Filed: Mar. 20, 2000

(30) Foreign Application Priority Data

Mar. 18, 1999 (DE) .......................... 199 12 106

(51) Int. Cl.⁷ .......................... B60J 7/043; B60R 13/02
(52) U.S. Cl. .................. 296/189; 296/214; 296/216.08; 280/751
(58) Field of Search ................ 296/2.4, 216.06–216.08, 296/189; 280/748, 751

(56) References Cited

U.S. PATENT DOCUMENTS 3,560,020 A * 2/1971 Barenyi ...................... 280/751
3,904,223 A * 9/1975 Wilfert et al. ............... 280/751
4,337,974 A * 7/1982 Kohlpaintner et al. ....... 296/214
5,052,744 A    10/1991 Sugimoto
5,575,500 A * 11/1996 Mimura et al. ............. 280/751
5,741,044 A * 4/1998 Kawai et al. ........... 296/189 X
6,086,098 A * 7/2000 Reiter et al. ................ 280/752
6,095,593 A * 8/2000 Johann et al. .............. 296/189

FOREIGN PATENT DOCUMENTS

| DE | 4142264 C1   | 12/1992 |
| DE | 1951412 A1   | 11/1995 |
| DE | 196 13 761 C1 | 7/1997  |
| DE | 19702336 A1  | 7/1998  |
| FR | 2 564 789 A1 | 11/1985 |

\* cited by examiner

Primary Examiner—Dennis H. Pedder
(74) Attorney, Agent, or Firm—Crowell & Moring, LLP

(57) ABSTRACT

A passenger car has at least one large-surface movable roof part which is guided on elongated guide rails arranged laterally of a roof opening. The guide rails extend adjacent to laterally exterior roof members, and the roof members as well as the guide rails are covered by a covering in the direction of the vehicle occupant compartment. In the event of a lateral impact of a vehicle occupant's head, the risk of injury is significantly reduced by the provision of a covering assigned at least in areas to an intermediately disposed deformation element which can be fixed in the guide rail.

14 Claims, 4 Drawing Sheets

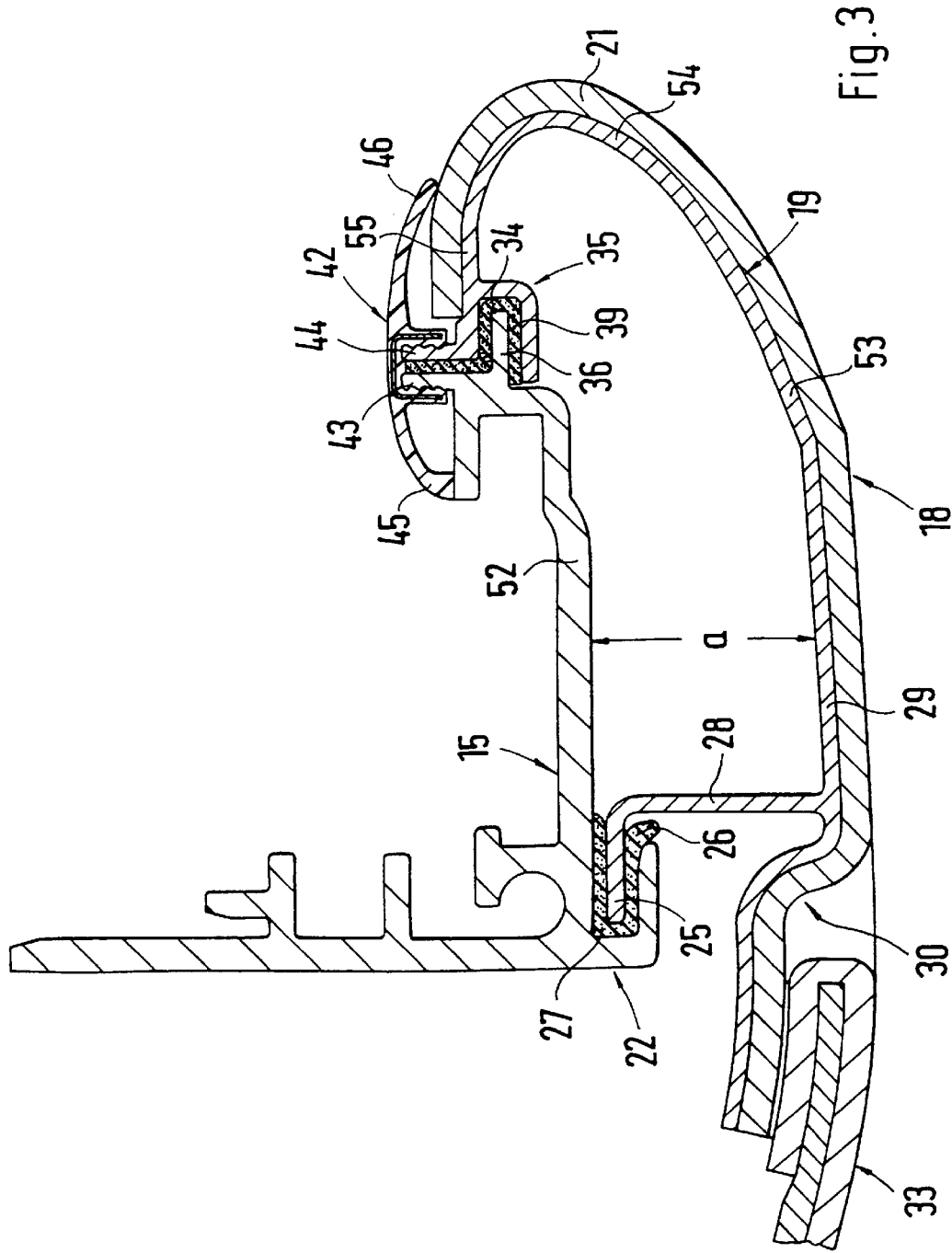

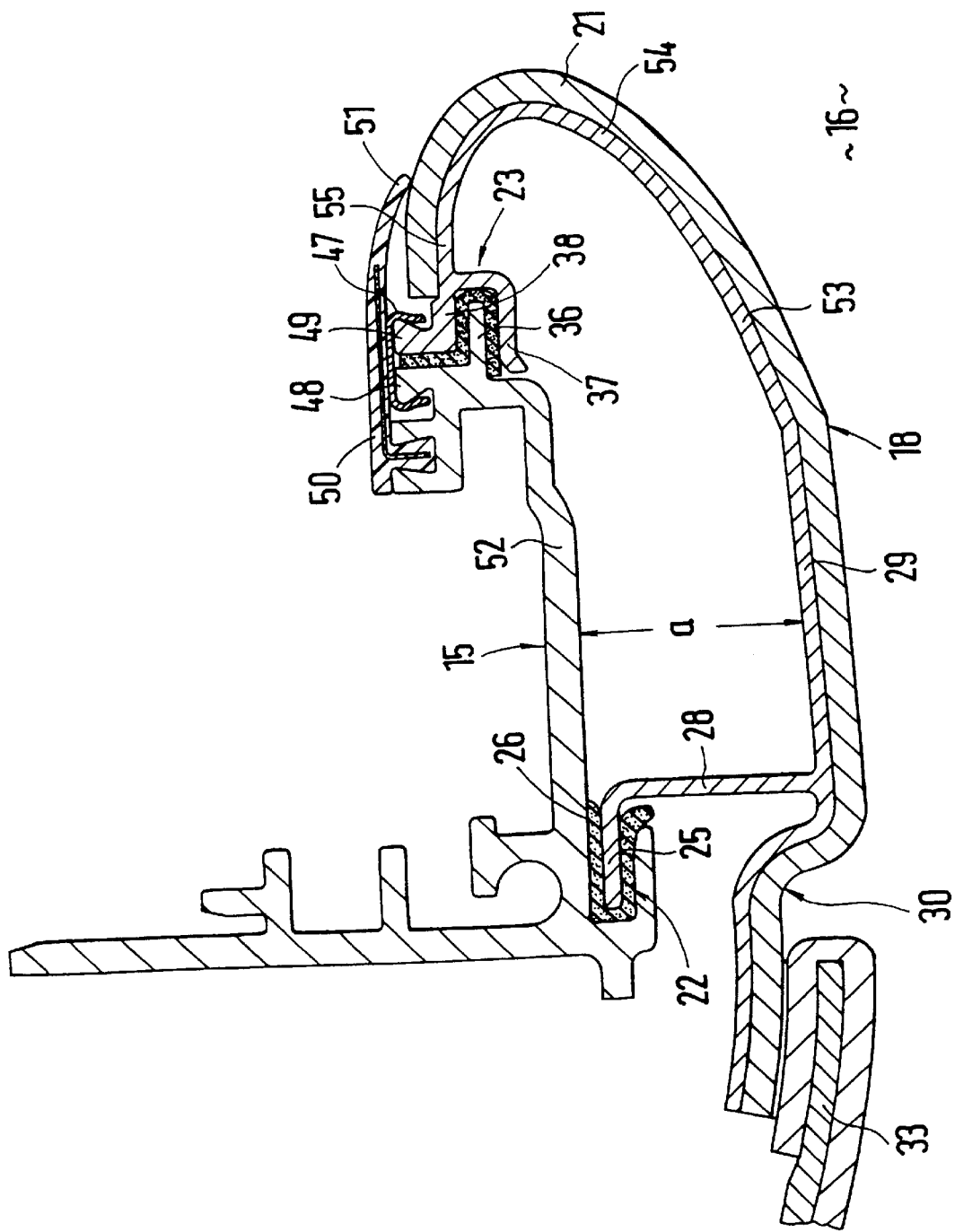

MOTOR VEHICLE, PARTICULARLY A PASSENGER CAR, HAVING MOVABLE ROOF PART

This application claims the priority of German application 199 12 106.0, filed Mar. 18, 1999, the disclosure of which is expressly incorporated by reference herein.

BACKGROUND AND SUMMARY OF THE INVENTION

The present invention relates to a motor vehicle, particularly a passenger car, having at least one large-surface movable roof part. Elongated guide rails on which the movable roof part is guided are arranged laterally of a roof opening. The guide rails extend adjacent to laterally exterior roof members, and a covering, by which the roof members and the guide rails are covered in a direction of the vehicle occupant compartment, is provided.

German Patent Document DE 196 13 761 C1 discloses a passenger car having at least one large-surface movable roof part which is longitudinally displaceably guided on elongated guide rails arranged laterally of a roof opening. The guide rails and the adjoining laterally exterior roof members are covered, in the direction of the vehicle occupant compartment, by a covering (fixed ceiling) disposed in front of the rails and roof members. In this arrangement, under unfavorable conditions, a vehicle occupant's head may suffer relatively serious injuries as a result of a lateral impact on the covering, on the guide rail, and/or on the roof member in the event of a lateral impact.

It is, therefore, an object of the invention to take measures to reduce the forces occurring in the event of an impact of a vehicle occupant's head in a motor vehicle of the type mentioned above in order to decrease the risk of injury. According to the invention, this object is achieved by assigning the covering, at least in areas, to an intermediately disposed deformation element which can be fixed on each of the guide rails. Additional advantageous characteristics of the invention are also reflected in the claims.

A principal advantage achieved by the invention is that, as a result of inserting a deformation element which carries at least a partial area of the covering, the forces occurring in the event of a head impact are reduced considerably by deformation of the deformation element. The deformation element, formed by a thin-walled extruded profile, can be produced in a simple manner and at low cost, and can be mounted rapidly. By linking the deformation element to the guide rails, the deformation element can be connected, while still outside the vehicle, with the prefabricated roof module. This reduces assembly time at the assembly line considerably.

Various embodiments of the invention are illustrated in the drawings and will be described in detail in the following.

BRIEF DESCRIPTION OF THE DRAWINGS

FIG. 3 is an enlarged sectional view similar to FIG. 2 but which shows a second embodiment of the deformation element; and FIG. 4 is an enlarged sectional view similar to FIG. 2 but which shows a third embodiment of the deformation element.

DESCRIPTION OF THE PREFERRED EMBODIMENTS

Figure 1:
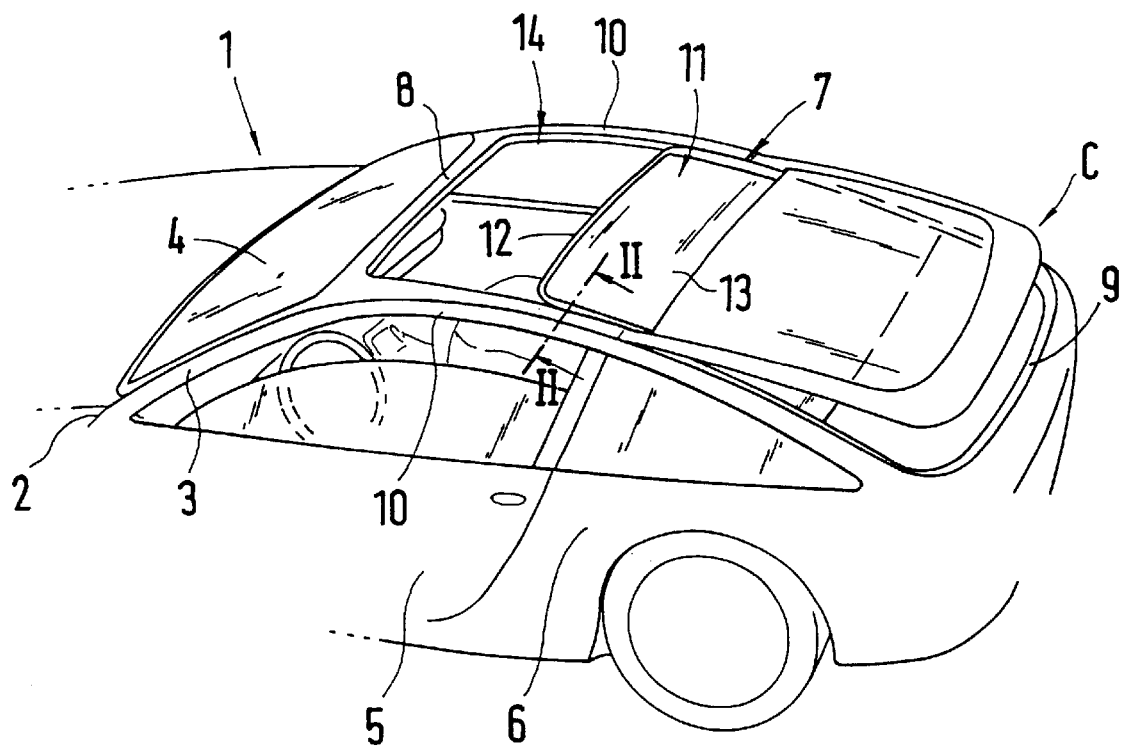
FIG. 1 is a perspective view, diagonally from the rear, of a passenger car with an openable vehicle roof in which a movable roof part takes up a partially pushed-back position and a tail gate is in a swivelled-up intermediate position.

A motor vehicle 1, which is illustrated in FIG. 1 and is formed by a passenger car, has a vehicle body 2, which is composed of a windshield 4 accommodated in a windshield frame 3, side doors 5, rearward side parts 6, and an openable vehicle roof 7.

The openable vehicle roof 7 is bounded in front by an upper transversely extending section 8 of the windshield frame 3 and, in the rear, by a rearward cross member 9. On both longitudinal sides, the roof is bounded by laterally exterior vehicle-body-side roof members 10.

According to FIG. 1, the vehicle roof 7 comprises at least one large-surface, movable-forward roof part 11 which, starting from its closed position, which is not shown in detail, can be moved to the rear under a swivellable tail gate and vice versa. FIG. 1 shows the forward roof part 11 in a partially pushed-back position in which the tail gate is in a swivelled-up intermediate position C.

In the embodiment shown in FIG. 1, the movable roof part 11 is formed by a glass cover 13 which is provided with an edge-side frame 12. Two or more movable roof parts may also be provided.

The adjusting movement of the roof part 11 is permitted by respective elongated profiled guide rails 15, which are provided on both lateral areas of a roof opening 14. The guide rails 15 are linked either directly or indirectly to the more exterior lateral roof members 10. With respect to a vehicle occupant compartment 16, the roof members 10 as well as the guide rails 15 are covered by a covering or ceiling 17. In the event of a lateral head impact, the risk of injury to a vehicle occupant is significantly reduced by assigning the covering 17, at least in regions, to an intermediately disposed deformation element 18 which can be fastened on the guide rail 15. The complete covering 17, or at least a partial area of the covering, is assigned to the deformation element 18.

The deformation element 18 is formed by a thin-walled extruded profile 19 made of a light-metal alloy (such as AlMGSi 0.5). The extruded profile 19, in sections, has an open construction in the upward direction and, in the mounted condition, together with regions of the guide rail 15, forms a closed hollow profile 20.

On the side facing the vehicle occupant compartment 16, the deformation element 18 is provided with a decorative cover 21 made of a TPO-foil, of leather, or of a similar material. The sections of the deformation element 18 carrying the cover 21, and the cover 21, form a partial area of the covering 17.

Figure 2:
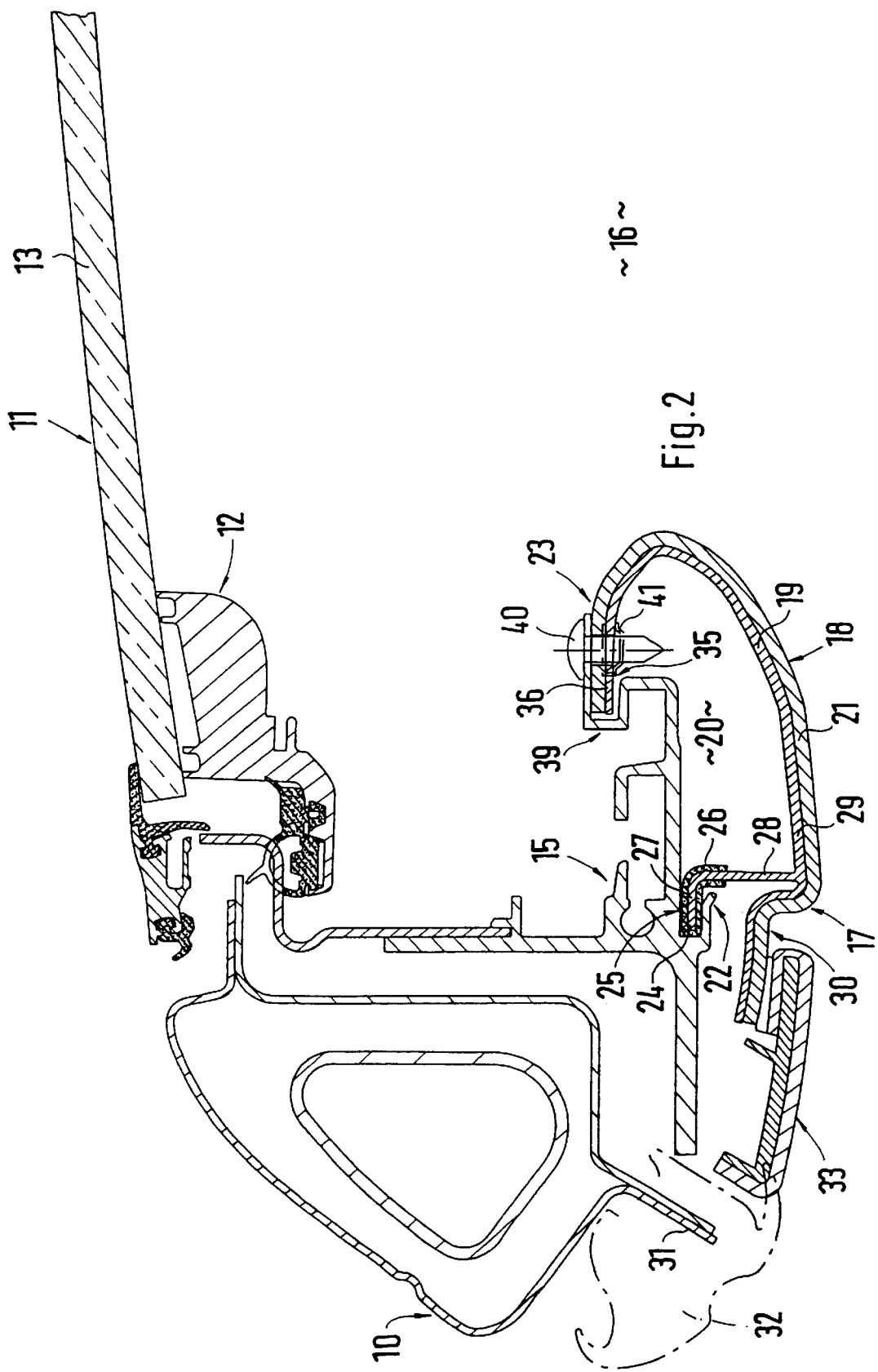
FIG. 2 is an enlarged sectional view along line II—II of FIG. 1 which shows a first embodiment of a deformation element.

FIGS. 2 to 4 show that the deformation element 18 can be connected with the guide rail 15 on at least two spaced fastening sections 22, 23.

On the side facing the adjoining roof member 10, the deformation element 18 has an upward and outward oriented first fastening section 22. The free end 24 of the outward oriented leg 25 is fitted, by way of at least one elastic element 26, laterally into an approximately U-shaped receiving device 27 of the guide rail 15 which is open on one side. The first fastening section 22 of the deformation element 18, in a cross-sectional view, has an approximately L-shaped profile, and has the free end of the longer leg 28 extending to a lower boundary wall 29 of the deformation element 18. Adjacent to the first fastening section 22, the deformation element 18 and the integrated covering 17 are bent upward and toward the exterior side. Between this bend 30 and a sealing body 32 fitted onto a flange 31 of the roof member 10, a narrow strip 33 is inserted. The narrow strip is locally held in position by way of fastening devices, which are not shown in detail, on the bend 30 or on the roof member 10. The strip 33 forms a partial area of the covering 17.

The second fastening section 23 is provided on the free upper end of the deformation element 18. According to FIGS. 3 and 4, with the insertion of an at least locally arranged elastic element 34, the second fastening section interacts with the guide rail 15 by way of a lateral plug-type connection 35. In addition, in this area, the deformation element 18 is fixed on the guide rail in the transverse direction of the vehicle.

The second fastening section 23 comprises a projecting holding web 36 which is arranged either on the guide rail 15 or on the deformation element 18, extends in the transverse direction of the vehicle, and is surrounded on both sides by legs 37, 38 of a U-shaped receiving device 39 constructed in each case on the other component. The at least one elastic element 34, which is made of rubber, felt, plastic or the like, is arranged between the holding web 36 and the interior side of the receiving device 39 in order to avoid noise.

FIG. 2 shows the holding web 36 as constructed on the deformation element 18 and the U-shaped receiving device 39 as constructed on the guide rail 15. In this embodiment, the deformation elements 18 are fixed in the transverse direction by fastening screws 40 which are screwed from above into fitted-on sheet metal nuts 41 of the guide rail 15.

FIGS. 3 and 4 show the holding web 36 as provided on the guide rail 15 and the U-shaped receiving device 39 as provided on the deformation element 18. The deformation element 18 is fixed in the transverse direction as shown in FIG. 3 by a clamping strip 42 which is placed from above and which is fitted onto identically oriented, exterior-side-profiled webs 43, 44 of the guide rail 15 and of the deformation element 18. The clamping strip 42 has opposed lip sections 45, 46 which cover the guide rail 15 and the deformation element 18 in sections.

FIG. 4 shows sheet metal clamps 47 as provided locally for connecting the guide rail 15 and the deformation element 18. The sheet metal clamps 47 reach from above and from the side around profiled webs 48, 49 of the guide rail 15 and the deformation element 18.

In order to cover the sheet metal clamps 47 in the upward direction, a cover strip 50 is provided. The cover strip is fixed on the guide rail, and an end-side lip 51 of the cover strip 50 is supported on the exterior side of the cover 21 of the deformation element 18.

In a cross-sectional view, the deformation element 18 has, adjoining to the first fastening section 22, an approximately horizontal, inwardly oriented first wall section 29 which is aligned approximately parallel to a bottom wall 52 of the guide rail 15. A second wall section 53, which extends diagonally inside and upward, extends away from this first wall section 29. The second wall section 53, by way of a bent transition area 54, changes into a third wall section 55 which is aligned approximately parallel to the first wall section 29. The contour of the deformation element 18 facing the vehicle occupant compartment 16 extends at a distance "a" with respect to the contour of the guide rail 15. This distance "a" is available as a maximum deformation path in the event of a head impact and is indicated in FIGS. 3 and 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Motor vehicle comprising:
   at least one large-surface movable roof part,
   elongated guide rails, arranged laterally of a roof opening, on which the movable roof part is guided, the guide rails extending adjacent to laterally exterior roof members, and
   a covering by which the roof members and the guide rails are covered in a direction of the vehicle occupant compartment,
   wherein the covering is assigned, at least in areas, to an intermediately disposed deformation element which can be fixed on each of the guide rails, and
   wherein, on a side facing one of the roof members, the deformation element has an upward and outward oriented first fastening section including a free end of an outward oriented leg, and further comprising at least one elastic element inserted in and fitted laterally into an approximately U-shaped receiving device of one of the guide rails which is open on one side.

2. Motor vehicle according to claim 1, wherein a second fastening section of the deformation element, with insertion of at least one elastic element, is connected by way of a plug-type connection with the one of the guide rails, and wherein an additional fixing of the deformation element takes place in the transverse direction on the one of the guide rails.

3. Motor vehicle according to claim 2, wherein fixing in the transverse direction takes place by any one of fastening screws, a clamping strip, and sheet metal clamps.

4. Motor vehicle according to claim 2, and further comprising a projecting holding web, which extends in the transverse direction of the vehicle, constructed on the guide rail, said holding web being surrounded on both sides by legs of a U-shaped receiving device constructed on the deformation element, the at least one elastic element, at least locally, being connected between the holding web and the receiving device.

5. Motor vehicle according to claim 2, and further comprising upright, upward-projecting webs constructed on each of the guide rails as well as on the deformation element, and a fitted-on clamping strip by which said webs are connected with one another.

6. Motor vehicle according to claim 5, wherein each clamping strip has opposed lip sections which cover one of the guide rails and the deformation element in sections.

7. Motor vehicle according to claim 2, and further comprising a projecting holding web, which extends in the transverse direction of the vehicle, constructed on the deformation element, said holding web being surrounded on both sides by legs of a U-shaped receiving device constructed on the guide rail.

8. Motor vehicle comprising:
   at least one large-surface movable roof part,
   elongated guide rails, arranged laterally of a roof opening, on which the movable roof part is guided, the guide rails extending adjacent to laterally exterior roof members, and
   a covering by which the roof members and the guide rails are covered in a direction of the vehicle occupant compartment, wherein the covering is assigned, at least in areas, to an intermediately disposed deformation element which can be fixed on each of the guide rails, wherein the deformation element is formed by a thin-walled extruded profile made of a light-metal alloy, and wherein, on a side facing one of the roof members, the deformation element has an upward and outward oriented first fastening section including a free end of an outward oriented leg, and further comprising at least one elastic element inserted in and fitted laterally into an approximately U-shaped receiving device of one of the guide rails which is open on one side.

9. Motor vehicle according to claim 8, wherein a second fastening section of the deformation element, with insertion of at least one elastic element, is connected by way of a plug-type connection with the one of the guide rails, and wherein an additional fixing of the deformation element takes place in the transverse direction on the one of the guide rails.

10. Motor vehicle according to claim 9, wherein fixing in the transverse direction takes place by any one of fastening screws, a clamping strip, and sheet metal clamps.

11. Motor vehicle according to claim 9, and further comprising a projecting holding web, which extends in the transverse direction of the vehicle, constructed on the guide rail, said holding web being surrounded on both sides by legs of a U-shaped receiving device constructed on the deformation element, the at least one elastic element, at least locally, being connected between the holding web and the receiving device.

12. Motor vehicle according to claim 9, and further comprising upright, upward-projecting webs constructed on each of the guide rails as well as on the deformation element, and a fitted-on clamping strip by which said webs are connected with one another.

13. Motor vehicle according to claim 12, wherein each clamping strip has opposed lip sections which cover one of the guide rails and the deformation element in sections.

14. Motor vehicle according to claim 9, and further comprising a projecting holding web, which extends in the transverse direction of the vehicle, constructed on the deformation element, said holding web being surrounded on both sides by legs of a U-shaped receiving device constructed on the guide rail.

* * * * *